United States Patent [19]
Abel

[11] Patent Number: 4,593,322
[45] Date of Patent: Jun. 3, 1986

[54] AUTOFOCUS SYSTEM FOR INFRARED IMAGING DEVICE

[75] Inventor: Irving R. Abel, Lexington, Mass.

[73] Assignee: Honeywell Inc., Minneapolis, Minn.

[21] Appl. No.: 690,909

[22] Filed: Jan. 14, 1985

[51] Int. Cl.[4] .............................................. H01J 31/49
[52] U.S. Cl. .................................... 358/227; 250/353; 358/206
[58] Field of Search .............. 358/285, 293, 227, 206, 358/226; 250/353; 354/404, 409, 405

[56] References Cited

U.S. PATENT DOCUMENTS

| | | | |
|---|---|---|---|
| 4,349,843 | 9/1982 | Laakman | 250/353 |
| 4,383,173 | 5/1983 | Neil | 250/353 |
| 4,404,594 | 9/1983 | Hannan | 358/227 |

FOREIGN PATENT DOCUMENTS

| | | | |
|---|---|---|---|
| 83219 | 7/1983 | European Pat. Off. | 358/206 |
| 2021898 | 12/1975 | United Kingdom | 358/206 |

*Primary Examiner*—Gene Z. Rubinson
*Assistant Examiner*—L. Schroeder
*Attorney, Agent, or Firm*—John S. Solakian; Albin Medved

[57] ABSTRACT

Apparatus for continuously determining the position of best focus of an objective lens and a system having a video output. The technique uses a transmissive plate of variable thickness located on one side of the field stop of the optical system associated with the video output. The plate covers the full vertical field of the system and covers on the order of 30 to 40 resolution elements in the horizontal direction. The plate is divided vertically into platelets of different thicknesses which are distributed in such a way as not only to cover the range of defocus of the system, but to discriminate against possible variations in scene content. The plate is placed outside the active area which will be displayed by the video; therefore the variations in thickness and in focus introduced by the plate are not displayed on the video, but are only used for the purpose of continuously determining the position of best focus. A spherical shell of zero power may be placed between the objective lens and the field stop in order to create a bias so that focal shifts introduced by the plate may be distributed about a nominal position, rather than all in a positive direction.

10 Claims, 3 Drawing Figures

AUTOFOCUS SYSTEM FOR INFRARED IMAGING DEVICE

BACKGROUND OF THE INVENTION

The apparatus of the present invention relates to automatic focus systems for optical imaging devices, particularly those which operate in the infrared and scan in a raster type pattern, for example, forward looking infrared systems ("FLIRs").

In thermal imaging systems, the scene may be defocused for a variety of reasons, for example, as a result of thermal and mechanical perturbations in the system, or as a result of actual variations in range to the scene. In high performance, low altitude airborne systems which are dependent on extensive sensor data, it is desirable to minimize pilot intervention in operation, thus reducing pilot workload. For a FLIR operating under conditions of variable range, thermal changes, and mechanical perturbations, this means that the sensor must contain an autofocus system.

Generally, mechanical perturbations are sufficiently minimized by design and construction techniques. However, thermal perturbations are more significant and difficult to remove, particularly in the case of a narrow field of view system using lens materials showing large changes in refractive index as a function of temperature. Focal instability caused by temperature variations might be minimized by use of different lens and mounting materials and mounting methods. However, this does not appear to be practical at this time.

A more practical method is to sense the temperature of the optics and to adjust the position of the focusing lens using a servo system. However, present temperature sensor systems are not accurate enough. Ultimately, the pilot has had to manually adjust focus, or systems have included a complex combination of temperature sensing and adjustment and image processing techniques.

One solution to the autofocus problem is described in the March, 1982 issue of the *Scientific Honeyweller*, Volume 3, No. 1, in the article entitled "Electronic Focus for Cameras", by N. Stauffer and D. Wilwerding, beginning at page 1. The described system, designed by Honeywell for 35 mm cameras (visible light), uses a separate set of detectors and charge coupled devices along with a microprocessor to effect automatic focus. A correlation is performed between sets of detectors utilizing two different, widely separated small areas of the aperture. The technique is based, as in optical rangefinders, on the angular difference between separate receivers in superimposing the same scene. This technique effectively determines not only whether the system is out of focus, but the amount and direction of lens movement required to achieve optimum focus.

Unfortunately this technique cannot be applied to a diffraction-limited system, such as a FLIR, because of the loss of image quality which results from using a small part of the aperture for focus information. In the case of a FLIR, the full aperture used for imagery must also be used to determine best focus. Consequently, an effective autofocus system for the FLIR would be based on processing the full video signal created by the scanning system and signal processing electronics. Best focus is characterized generally by the greatest image sharpness, which is equivalent to the maximum transfer of the high spatial frequencies in the video signal, or by the highest contrast at small objects or edges. Such contrast is represented by the slopes of the irradiance function in the image or video signal.

To use the video ouptut of the FLIR to determine optimum focus, it is necessary to compare the video signal when the focusing lens is located at different focal positions. One technique is to dither the focusing lens longitudinally along the optical axis of the system, process the signal so as to determine the focal bias, and then to restore a zero bias by moving the focusing lens to the appropriate position.

There are two limiting aspects of this approach. One lies in the use of a mechanical dither to provide a range of focal positions for the determination of the optimum focus. A passive system would be more attractive because dither results in blurring of the scene displayed on the video and because of design considerations involved due to mechanical movement. Secondly, the technique depends on a dither range which is large enough for focus discrimination, while still being small enough to provide acceptable imagery for continuous operation. These requirements are satisfied as long as the processor can extract the desired information without dither perceptible to the viewer. This design constraint results from the common use of the full video within a common time period, both for viewing and for focus determination.

It is, accordingly, a primary object of the present invention to provide an automatic focus system for an infrared imaging device which compensates for focal shifts resulting from range variations, temperature or mechanical perturbations, but which does not require dithering the focusing lens of the system to find the position of best focus, and does not distort or interrupt the viewing of the screen.

SUMMARY OF THE INVENTION

The above and other objects of the present invention are achieved by placing a variable thickness focal plate at the edge of the field stop out of the active viewing area of the system, in order to separate each video line scan into a section received for display, and a smaller section reserved for providing focusing information. The approach can be implemented in a passive form by building into the field of view a section containing a coded pattern of focus conditions. Such coded pattern may be established through the use of a germanium plate located at the side of the field stop in the collimator assembly. The plate is subdivided in sections of different thicknesses so as to establish different focal planes at the detector assembly. A section includes a set of focus changes in steps covering a prescribed focal range. The exact number and coded sequences can be determined on the basis of focal resolution and the anticipated possible variations and distributions in frequency and contrast content in the scene.

This technique allows a wide variation of focal position without interfering with the scene presentation. Where the scene content is variable and changing, the correlation between video scan lines from the same or related plate sections of equal thicknesses will provide a clear indication of the optimum focus. The particular number of sections and sequence within each section provides enough information from which to determine best focus unambiguously.

In order to realize both positive and negative values of focus, it may be necessary to bias the focus of the displayed field with a thin germanium plate also placed at the field stop. This bias plate may take the form of a spherical shell, in order to avoid the introduction of narcissus (self-imaging of the detector assembly which degrades the FLIR image.)

BRIEF DESCRIPTION OF THE DRAWINGS

The objects of the present invention are achieved in the illustrative embodiments as described with respect to the Figures in which.

DETAILED DESCRIPTION OF THE PREFERRED EMBODIMENT(S)

Figure 1:
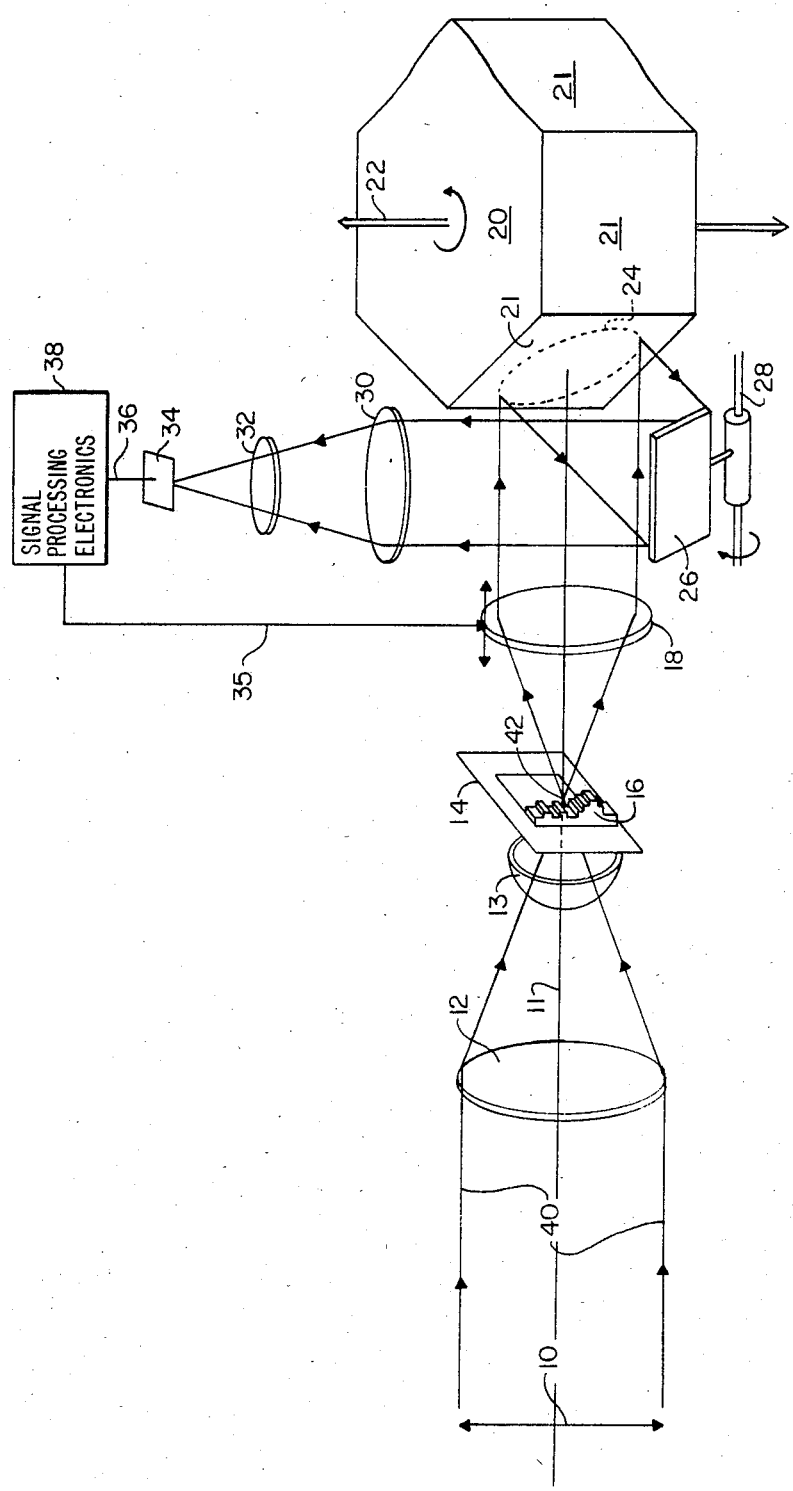
FIG. 1 is a schematic view of a FLIR device utilizing the autofocus apparatus of the present invention.

The apparatus of the present invention includes an objective lens 12, field stop 14, collimating lens 18, scan wheel 20, nodding mirror 26, detector lens 30 and detector assembly 34 with cold shield 32. Radiation from scene 10 enters the FLIR system through the objective lens 12 as shown by beam 40. Scene 10 is imaged at the plane containing point 42 located at field stop 14. Collimating lens 18 directs the energy of beam 40 from scene 10 onto facets 21 of scanning polygon 20 shown by pupil 24. Beam 40 is reflected off successive facets 21 onto nodding mirror 26. Beam 40 is reflected off nodding mirror 26 through detector lens 30 and cold shield 32 to strike detector elements located in detector assembly 34. The combined rotation of polygon 20 about axis 22, and the movement of nodding mirror 26 about axis 28, results in a raster type scan of the scene of interest 10, as described in an article by R. F. Anderson, entitled "TV-Compatible Forward Looking Infrared", Optical Engineering magazine, Volume 13, No. 4, pages 335–338 (July/August, 1974), as the field of view time-shares the detectors located on assembly 34. The electronic signal generated by detectors 34 is fed via signal line 36 to signal processing electronics 38. This signal is then fed in turn to a television display tube, not shown, along with scanner synchronized deflection voltages to produce an image of the scene on the display.

Figure 2:
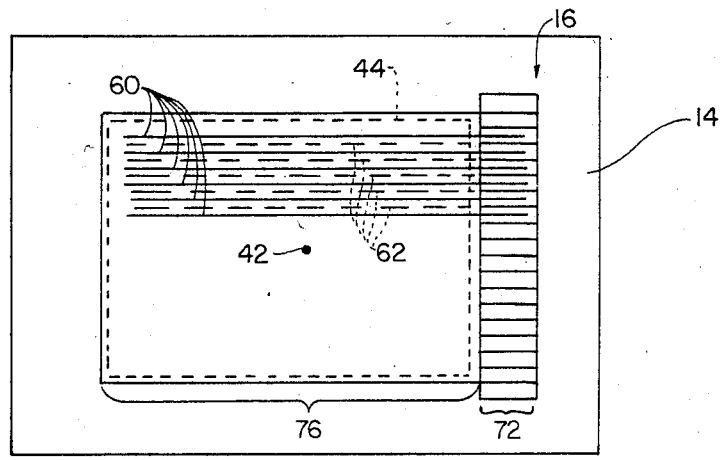
FIG. 2 is a plan view of the field stop and focal plate of the autofocus apparatus of the present invention.

FIG. 2 shows field stop 14 of the apparatus of the present invention. Because field stop 14 is located at the focal point 42 of objective lens 12, a real image of scene 10 is projected onto field stop 14. The combined scanning motion of mirrors 20 and 26 then creates a raster scan pattern of elements of detector assembly 34 across the image of the scene, as shown by scan lines 60 and 62 on FIG. 2. The actual area of display of the scene on the CRT is defined by active area 44 as outlined by the dotted line. The multifaceted focusing plate 16 is placed on the edge of field stop 14, as shown. Each scan line 60 thus contains a region 76 which will be imaged on the CRT, and a region 72 which passes through plate 16 and is only used for the purposes of determining the position of best focus.

Plate 16 is subdivided into sections of different thickness in order to establish different focal planes of the image at the detector 34. One or more scan lines 60 receive the defocused image as shown in FIG. 2. The profile 54 of plate 16 may take almost any form. The exact number of steps, their thickness (i.e., height) 50 and width 52, are determined on the basis of the focal resolution of the system and the anticipated possible variations and distribution in frequency and contrast in scene 10. It may be, for example, that one area of scene 10 has little detail, for example a cloudless sky, so that to bias the image with a range of focal positions as accomplished by plate 16 would lead to inconclusive or incorrect results. By subdividing focusing ranges in a non-monotonic manner, as shown in FIG. 3, detail throughout the entire scene 10 may be examined in order to obtain correct focal position.

Figure 3:
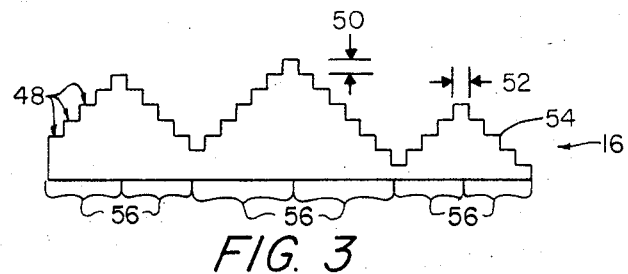
FIG. 3 shows a cross-section of the focal plate of the present invention.

By way of example and not necessarily referring to FIG. 3, in a FLIR system having a CRT with 525 scan lines, plate 16 may be designed with four sections 56, each with eight steps 48 in which each of the steps 48 covers sixteen (16) scan lines 60. Although each step may cover sixteen (16) scan lines 60, the system may be implemented using only information from the median scan line in order to cover a defocussed area. The width of region 72 of plate 16 may cover on the order of 30 to 40 resolution elements in the horizontal direction. For example, if field stop 14 is 0.35 inches high and 0.50 inches wide, focusing plate 16 may also be 0.35 inches high, but only 0.04 inches wide. If plate 16 consisted of four sections 56, each section 56 would be about 0.09 inches long, with, for example, each section 56 having eight steps 48, each step being about 0.011 inches long. Each section 56 may vary from some nominal base thickness to approximately 0.04 inches thick. The selection of 0.011 inches length steps in each section 56 would allow a defocus of 0.030 inches in the entire FLIR system while maintaining the radiation from the median line to be totally covered by each step 48.

While each step 48 may cover about sixteen (16) scan lines 60, only the median of region 72 might be used for information so that a defocus spot from objective lens 12 would be fully covered by the detector element of assembly 34.

The coded pattern 54 is selected to cover not only the range of defocus of the FLIR system but also to discriminate against possible variations in scene content. In other words, for each particular distribution of scene content there may be an optimum coding profile 54, optimum step width 52 and step height 50, in order to determine the appropriate focusing position.

It is understood that the described autofocus system would perform best when viewing a scene at a fairly constant range. If the object area of interest lies exclusively in region 76, and the scene content included in regions 76 and 72 are at different ranges, optimum focus may not be obtained for that particular object area. However, the FLIR system may be made such that alternate forms of plate 16 could be inserted readily for variable scene viewing conditions. As an example, profile 54 may be adjusted for forward looking aircraft applications to correct for the fact that object points close to the nadir would be different from those closer to the horizon, or in the lower portion, i.e., foreground, of the scene 10.

Plate 16 may be manufactured by any well-known lapping and polishing techniques or by diamond turning machining techniques. Because plate 16 has a positive thickness across its entire length, it may only be used to detect a range of focus positions in one direction with respect to the objective lens 12. As shown in FIG. 1, this may be compensated for by inserting a bias plate between objective lens 12 and field stop 14. This bias plate may consist of a thin germanium plate, for example 0.04 inches thick, over the main section of the field stop. In order to correct or reduce narcissus, the plate can be implemented in the form of a curved shell 13 of zero optical power.

The multifaceted focusing plate 16 may thus be thought of as a geometric weighting function on the image in which areas of scene 10 are compared with the focusing range shift introduced by a particular platelet 48 of plate 16. By comparing the video signal for each of scan lines 60 between region 76 (normal viewing) and region 72 which passes through plate 16, it is possible to effectively examine the video at all points in the field of view over a range of focal positions without introducing actual mechanical shifts in the position of objective lens 12 or collimating lens 18, as is common in most autofocus systems.

Signal processing electronics 38 may include well-known detector amplifier and signal processing electronics, as well as those necessary for deriving the correct focus position from the video scan lines 60. The algorithms in electronics 38 to drive the position of correct focus would include standard techniques in which video spatial frequency densities are computed from amplitude modulation video signals from each of scan lines 60, or from the integration of differentiated broad video information from each scan line 60 in order to obtain a sharpness or contrast value for any scanned line.

Signal processing electronics 38 may be implemented using available systems such as, for example, the System S570 manufactured by International Imaging Systems and described in its copyrighted User's Manual, Version 3.0, PN 777-0053-000, February, 1984.

In general, those scan lines 60 having regions 72 with the highest frequency content, or irradiance slopes, would indicate the correct amount of focal shift to be introduced by the autofocus system. The signal processing electronics 38 would, therefore, include a look-up table or some similar means of relating a particular scan line 60 with the correct amount of focal shift introduced by the corresponding step 48 on plate 16. Each step 48 may have one or more scan lines 60 associated with it. Generally, the median scan line 60 corresponding to each step 48 will be used for processing in order to derive video information from a common focal plane.

Signal processing electronics 38 would then generate a feedback signal 35, which would direct the motion of objective lens 12 or collimating lens 18 along axis 11 as shown in FIG. 1. Movement along axis 11 may be accomplished by any well-known motorized lens mount apparatus.

Having described the invention, what is claimed as new and novel and for which it is desired to secure Letters Patent is:

1. Apparatus for determining the position of best focus of a system for imaging radiation from a scene of interest, said apparatus comprising
   A. a focal plane;
   B. means for receiving a beam of energy from said scene of interest;
   C. a transmissive plate positioned at said focal plane, said plate comprising a plurality of regions having different thicknesses, each said thickness providing a different optical path length, and wherein said plate is positioned in the path of a portion of said beam in order to create a focal bias substantially equal to each said optical path length of each said region;
   D. at least one detector element coupled to receive said beam in order to create an electrical signal whose intensity relates to the brightness of said scene of interest;
   E. means for scanning said beam across said scene of interest in order to create a raster type scan pattern in which points on said scene of interest are imaged on said at least one detector element; and wherein
   F. that portion of said beam passing through said transmissive plate onto said at least one detector element by means of said means for scanning provides different frequency content of said signal, wherein the highest said frequency content corresponds to the position of best focus of said system.

2. Apparatus as in claim 1 wherein said means for receiving includes an objective lens.

3. Apparatus as in claim 1 wherein said means for receiving includes a focusing lens for focusing said beam substantially at said focal plane.

4. Apparatus as in claim 1 wherein said means for receiving includes means for focusing said beam at said focal plane; and wherein said system further comprises means for collimating said beam focussed at said focal plane before it is received by said means for scanning.

5. Apparatus as in claim 4 further comprising means responsive to said frequency content of said beam for moving said means for focussing a distance substantially equivalent to the focal bias introduced by said thickness of said region which corresponds to said highest frequency content.

6. Apparatus as in claim 4 further comprising means responsive to said frequency content of said beam for moving said means for collimating a distance substantially equivalent to the focal bias introduced by said thickness of said region which corresponds to said highest frequency content.

7. Apparatus as in claim 1 wherein said transmissive plate receives substantially all of said portion of said beam received in said raster scan pattern from said means for scanning.

8. Apparatus as in claim 1 wherein said transmissive plate is divided in a direction tranverse to said raster scan pattern into said different thicknesses which thicknesses are distributed so as to not only cover the range of possible defocus of said system but to also discriminate against possible variations in the contents of said scene.

9. Apparatus as in claim 1 further comprising an optical element placed between said means for receiving and said focal plane in order to create a bias so that focal shifts introduced by said transmissive plate may be distributed about a nominal position.

10. Apparatus as in claim 9 wherein said optical element is a spherical shell having substantially zero optical power.

* * * * *